C. W, PALMER & C. HOUGHTON.

Assignors by mesne assignments to the MERINO SHOE Co.

Felt-Shoes.

No. 8,070. Reissued Feb. 5, 1878.

Witnesses.
W. J. Pratt.
L. A. Baxter.

Inventors
Charles W. Palmer and
Charles Houghton
by Crosby & Gregory Attys.

N. PETERS, PHOTO-LITHOGRAPHER, WASHINGTON, D. C.

UNITED STATES PATENT OFFICE.

CHARLES W. PALMER, OF LYNN, AND CHARLES HOUGHTON, OF BOSTON, MASSACHUSETTS, ASSIGNORS, BY MESNE ASSIGNMENTS, TO THE MERINO SHOE COMPANY.

IMPROVEMENT IN FELT SHOES.

Specification forming part of Letters Patent No. 98,793, dated January 11, 1870; Reissue No. 8,070, dated February 5, 1878; application filed January 18, 1878.

*To all whom it may concern:*

Be it known that we, CHARLES W. PALMER, of Lynn, in the county of Essex, and CHARLES HOUGHTON, of Boston, in the county of Suffolk, all in the State of Massachusetts, have invented an Improved Shoe, of which the following, taken in connection with the drawings accompanying it, is a specification:

Letters Patent No. 87,063 were granted February 16, 1869, to Charles W. Palmer for an improved felt shoe, made seamless in one piece, with the bottom or sole made of greater thickness than the top or upper, to enable it to sustain the greater wear to which its position subjects it.

Our present invention relates to a seamless felted shoe, and to the manner of rendering the sole thereof enduring.

This invention consists of a shoe made from wool, in one piece, without seam, so as to cover the whole foot, top and bottom, that portion of the felted wool under the bottom of the foot constituting the inner sole, such shoe being provided with an outer or auxiliary sole, affixed by stitches or other suitable fastening devices.

Figure 1:
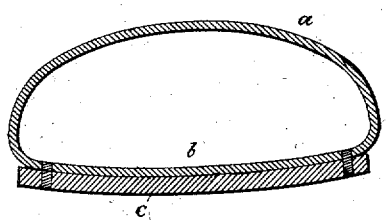
Figure 2:
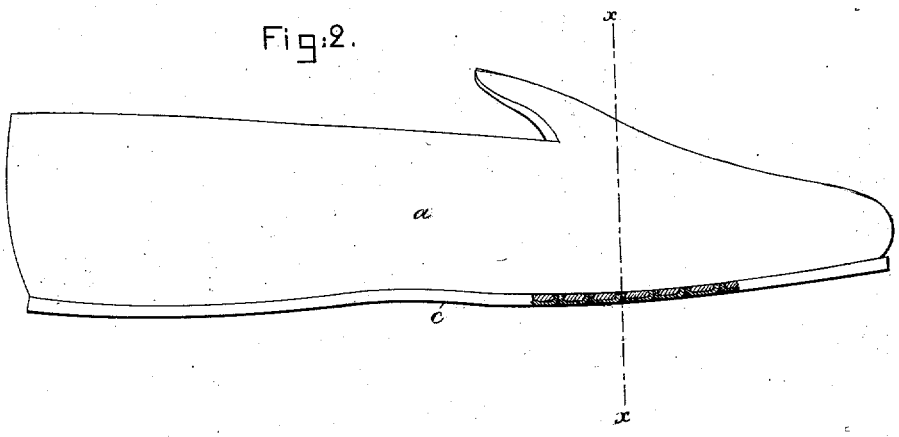

The drawings represent a shoe embodying our improvement. Figure 1 shows a section on the line *x x*. Fig. 2 is a side view of the shoe, the outer sole and upper being slightly broken away to show the fastenings.

*a* denotes the upper; *b*, the sole; they being made of felt, or rather of fibers, felted into shape to form a shoe by the ordinary process of felting as employed, for instance, in forming hats, there being no seam in the felt.

The part forming the inner sole is made of the same, or substantially the same, thickness as the upper.

To its under surface is fastened the outer sole *c*. As before observed, this outer sole is preferably made of leather; but leather-board, or other material possessing the proper degree of rigidity and flexibility, may be used.

The sole may be formed of any degree of thickness, in accordance with the wear to which the shoe is to be subjected. It may be fastened by stitches running through and through from the outer surface of the outer sole to the inner surface of the inner sole, (the sewing being effected by the well-known McKay sole-sewing machine;) or nails, pegs, or other fastenings may be used.

It will be obvious that a shoe thus made is adapted to some extent to outdoor wear as well as a house-shoe, and that, while it possesses the desirable qualities of softness and capability of yielding to the form of the foot, the auxiliary sole renders it as enduring to wear as is an ordinary leather shoe. The freedom of the main part of the shoe from seams gives it a neat appearance, and there are no stitches to break or give way. By making the wearing-sole of leather or similar material the shoe is better adapted to outdoor walking, as the outer sole better withstands pressure upon stones or other uneven substances.

It will be obvious that a heel may be similarly applied to the felt shoe, either in addition to the leather sole or directly to the felt.

We claim—

As an improved article of manufacture, a shoe made with its upper and the part *b*, which forms its inner sole, felted in one seamless piece, and provided with an outer sole, secured thereto, substantially as described.

CHAS. W. PALMER.
CHS. HOUGHTON.

Witnesses:
G. W. GREGORY,
W. J. PRATT.